US010709970B2

(12) United States Patent
Weekes

(10) Patent No.: US 10,709,970 B2
(45) Date of Patent: Jul. 14, 2020

(54) ELECTRIC GAMING MACHINES, AND METHODS OF OPERATING ELECTRONIC GAMING MACHINES, CONFIGURED TO ENABLE DISPLAY OF GAME DISPLAY DATA AND ADDITIONAL INFORMATION VIA COMMON VIDEO OUTPUT

(71) Applicant: Ainsworth Game Technology Limited, Newington (AU)

(72) Inventor: Lee Howard Weekes, The Rocks (AU)

(73) Assignee: Ainsworth Game Technology Limited, Newington, NSW (AU)

(*) Notice: Subject to any disclaimer, the term of this patent is extended or adjusted under 35 U.S.C. 154(b) by 677 days.

(21) Appl. No.: 14/831,426

(22) Filed: Aug. 20, 2015

(65) Prior Publication Data

US 2017/0014712 A1 Jan. 19, 2017

(30) Foreign Application Priority Data

Jul. 14, 2015 (AU) ................................ 2015204292

(51) Int. Cl.

| | |
|---|---|
| ***A63F 13/00*** | (2014.01) |
| ***A63F 13/23*** | (2014.01) |
| ***A63F 9/24*** | (2006.01) |
| ***A63F 13/26*** | (2014.01) |
| ***G07F 17/32*** | (2006.01) |

(52) U.S. Cl.

CPC ................ *A63F 13/23* (2014.09); *A63F 9/24* (2013.01); *A63F 13/26* (2014.09); *G07F 17/32* (2013.01); *G07F 17/326* (2013.01); *G07F 17/3211* (2013.01); *G07F 17/3225* (2013.01); *G07F 17/3241* (2013.01); *G07F 17/3267* (2013.01); *A63F 2009/2457* (2013.01)

(58) Field of Classification Search

CPC ................................ A63F 13/23; A63F 13/26

See application file for complete search history.

(56) References Cited

U.S. PATENT DOCUMENTS

| | | | | |
|---|---|---|---|---|
| 2007/0021195 | A1 | 1/2007 | Campbell et al. | |
| 2007/0082737 | A1* | 4/2007 | Morrow .................. | G07F 17/32 463/42 |
| 2008/0096659 | A1* | 4/2008 | Kreloff ............... | G07F 17/3209 463/39 |
| 2008/0274795 | A1* | 11/2008 | Carpenter .............. | G07F 17/32 463/25 |
| 2013/0053148 | A1* | 2/2013 | Nelson .................. | G07F 17/323 463/42 |
| 2013/0165208 | A1* | 6/2013 | Nelson ................ | G07F 17/3223 463/25 |

* cited by examiner

*Primary Examiner* — Omkar A Deodhar
*Assistant Examiner* — Eric M Thomas
(74) *Attorney, Agent, or Firm* — Cook Alex Ltd.

(57) ABSTRACT

Described herein are electronic gaming machines, and methods of operating electronic gaming machines, configured to enable display of game display data and additional information via common video output. Embodiments of the invention have been particularly developed to enable display of information such as machine diagnostics and bonus games, for example via a secondary display device. While some embodiments will be described herein with particular reference to that application, it will be appreciated that the invention is not limited to such a field of use, and is applicable in broader contexts.

20 Claims, 3 Drawing Sheets

FIG. 3

ELECTRIC GAMING MACHINES, AND METHODS OF OPERATING ELECTRONIC GAMING MACHINES, CONFIGURED TO ENABLE DISPLAY OF GAME DISPLAY DATA AND ADDITIONAL INFORMATION VIA COMMON VIDEO OUTPUT

FIELD OF THE INVENTION

The present invention relates to electronic gaming machines, and methods of operating electronic gaming machines, configured to enable display of game display data and additional information via common video output. Embodiments of the invention have been particularly developed to enable display of information such as machine diagnostics and bonus games, for example via a secondary display device. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Electronic gaming machines are often heavily regulated by various governing authorities. This provides significant limitations on the ability to develop peripheral devices that access diagnostic information from machines, for example due to perceived risks of tampering and the like.

SUMMARY OF THE INVENTION

It is an object of the present invention to overcome or ameliorate at least one of the disadvantages of the prior art, or to provide a useful alternative.

One embodiment provides a method for operating an electronic gaming machine, the method including:

executing a game of chance based on input from a user;

defining a primary video display signal, wherein the primary video signal is configured to enable rendering of a graphical output representative of the game of chance at a primary display screen;

defining a plurality of non-display frames, wherein the non-display frames are configured to be intercepted by a decoder device, thereby to enable rendering of additional information at a secondary display screen; and providing, via a video output port, an output video signal defined by a continuous sequence of video frames including the primary video display signal and the plurality of non-display frames, wherein the non-display frames are embedded in frames defining the primary video display signal in accordance with a predefined protocol;

such that the primary display screen displays the graphical output representative of the game of chance, but does not provide a visually perceptible rendering of the additional information.

One embodiment provides a method wherein the predefined protocol embeds a non-display frame at every $i^{th}$ frame in the output video signal.

One embodiment provides a method wherein the predefined protocol embeds a first category of non-display frame at every $i^{th}$ frame in the output video signal and embeds a second category of non-display frame at every $j^{th}$ frame in the output video signal.

One embodiment provides a method wherein embedding a non-display frame in the output video signal includes replacing a primary video display signal frame with a non-display frame.

One embodiment provides a method wherein embedding a non-display frame in the output video signal includes embedding additional information into a primary video display signal frame.

One embodiment provides a method wherein the additional information is embedded at one or more predefined regions in a primary video display signal frame.

One embodiment provides a method wherein the one or more predefined regions are regions at which there is minimal inter-frame variation in graphical output representative of the game of chance.

One embodiment provides a method wherein a decoder device is configured to remove the predefined region from a frame containing embedded additional information.

One embodiment provides a method wherein at least a subset of the non-display frames are configured to be intercepted by a decoder device, thereby to enable rendering of gaming machine diagnostic information at a secondary display screen.

One embodiment provides a method wherein at least a subset of the non-display frames are configured to be intercepted by a decoder device, thereby to enable rendering of a secondary game at a secondary display screen.

One embodiment provides a gaming machine including:

a central control unit that is configured to execute a game of chance based on input from a user, wherein the central control unit is configured to:

define a primary video display signal, wherein the primary video signal is configured to enable rendering of a graphical output representative of the game of chance at a primary display screen;

define a plurality of non-display frames, wherein the non-display frames are configured to be intercepted by a decoder device, thereby to enable rendering of additional information at a secondary display screen; and provide, via a video output port, an output video signal defined by a continuous sequence of video frames including the primary video display signal and the plurality of non-display frames, wherein the non-display frames are embedded in frames defining the primary video display signal in accordance with a predefined protocol;

a primary display screen;

a decoder unit interposed between the central control unit and the primary display screen, wherein the decoder unit is configured to intercept the output video signal, such that the primary display screen displays the graphical output representative of the game of chance, but does not provide a visually perceptible rendering of the additional information, and such that the additional information is made available for rendering at a secondary display screen.

One embodiment provides a gaming machine wherein the predefined protocol embeds a non-display frame at every $i^{th}$ frame in the output video signal.

One embodiment provides a gaming machine wherein the predefined protocol embeds a first category of non-display frame at every $i^{th}$ frame in the output video signal and embeds a second category of non-display frame at every $j^{th}$ frame in the output video signal.

One embodiment provides a gaming machine wherein embedding a non-display frame in the output video signal includes replacing a primary video display signal frame with a non-display frame.

One embodiment provides a gaming machine wherein embedding a non-display frame in the output video signal includes embedding additional information into a primary video display signal frame.

One embodiment provides a gaming machine wherein the additional information is embedded at one or more predefined regions in a primary video display signal frame.

One embodiment provides a gaming machine wherein the one or more predefined regions are regions at which there is minimal inter-frame variation in graphical output representative of the game of chance.

One embodiment provides a gaming machine wherein a decoder device is configured to remove the predefined region from a frame containing embedded additional information.

One embodiment provides a gaming machine wherein at least a subset of the non-display frames are configured to be intercepted by a decoder device, thereby to enable rendering of gaming machine diagnostic information at a secondary display screen.

One embodiment provides a gaming machine wherein at least a subset of the non-display frames are configured to be intercepted by a decoder device, thereby to enable rendering of a secondary game at a secondary display screen.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which:

FIG. 3 illustrates a frame-to-frame comparison for one embodiment.

DETAILED DESCRIPTION

Described herein are electronic gaming machines, and methods of operating electronic gaming machines, configured to enable display of game display data and additional information via common video output. Embodiments of the invention have been particularly developed to enable display of information such as machine diagnostics and bonus games, for example via a secondary display device. While some embodiments will be described herein with particular reference to that application, it will be appreciated that the invention is not limited to such a field of use, and is applicable in broader contexts.

Figure 1:
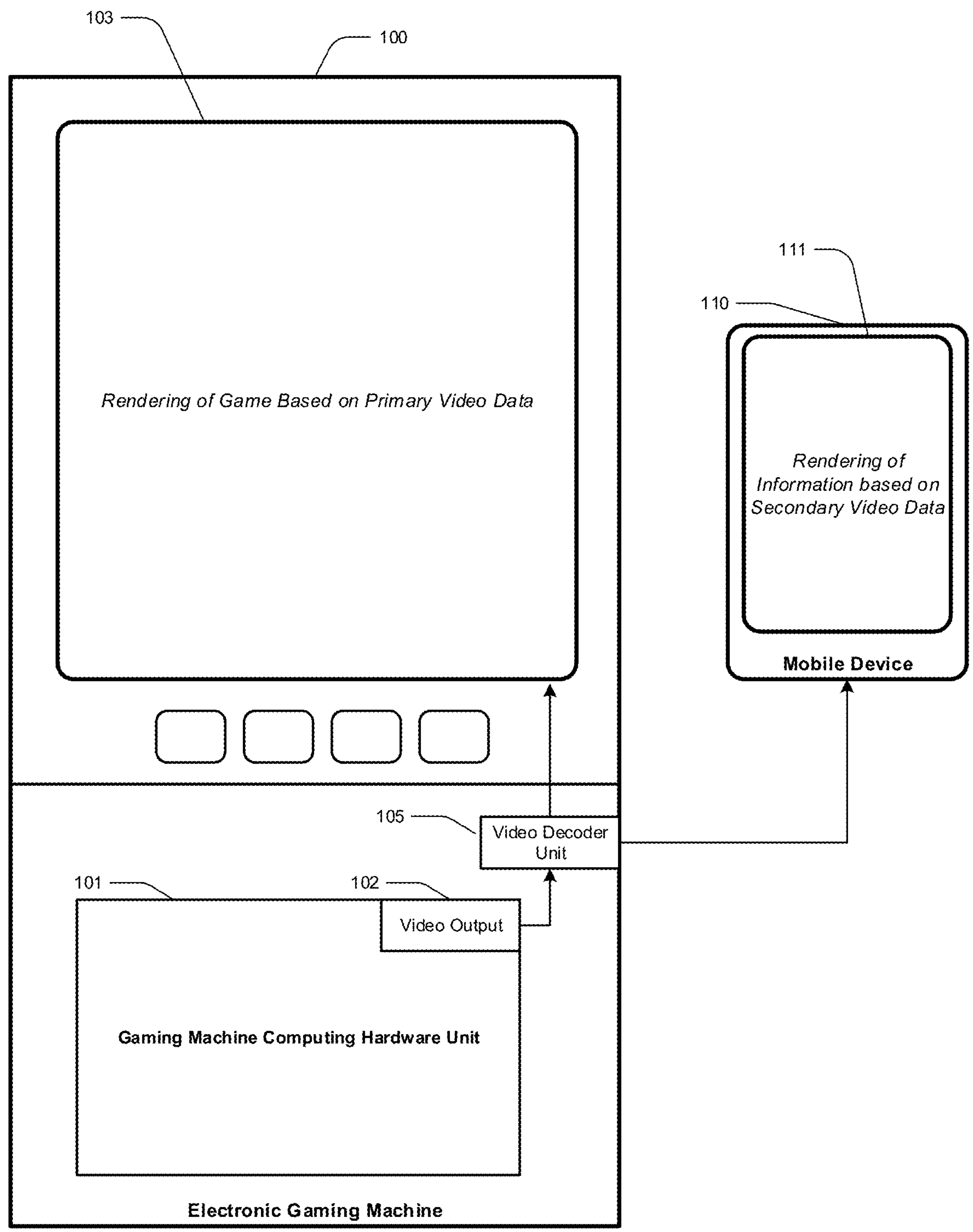
FIG. 1 illustrates a gaming machine and separate display device according to one embodiment.

The technology described herein is applicable to gaming machines such as EGM 100 illustrated in FIG. 1, which include a computing hardware unit 101 (which in some embodiments is contained by a secure processor box), which provides a video output port 102 that is coupled to a display screen 103. A game executes via execution of software instructions hardware unit 101 (or, in some arrangements, via execution of game software instructions a remote device that communicates via a network with hardware unit 103). Hardware unit 101 defines video signals configured to enable rendering of a graphical user interface for the game via display screen 103. These are transmitted via video output port 102. There are various forms of video output port commonly used in various embodiments, with examples including HDMI, DVI, Display Port, Composite, and so on. It will be appreciated, in this regard, that the technology is therefore applicable to a wide range of known EGM types.

In overview, the technology described herein includes embedding additional information in the video signal provided by hardware unit 101 via video output 102. This is achieved via software instructions executing within hardware unit 101. In some embodiments this software causes embedding of "non-display information" in a subset of video frames that are defined for output via video output port 105 based on a predefined protocol. These frames are referred to as "non-display frames". The "non-display information" is information that is not intended for display via screen 103. In some cases non-display frames are not displayed at all via screen 103. In some cases one or more regions from each non-display frame are extracted and not displayed via screen 103.

For example, in some embodiments the predefined protocol embeds a non-display frame at every $i^{th}$ frame in the output video signal. The value for "i" varies between implementations; for example in some cases "i" is a value between 20 and 200. It will be appreciated that the following factors affect selection of a value for "i":

- Preventing noticeable effects to frame rate at display 103. In various embodiments discussed below, each non-display frame is "dropped" (i.e. not displayed by screen 103). In some embodiments, as discussed below, those effects are mitigated by a frame blended process.
- Desired polling rates for information conveyed by the non-display data. For example, where the non-display data is diagnostic information, there may be a desire to have it refreshed on a particular timeframe. In some embodiments such information is buffered prior to embedding in non-display framed thereby to provide a higher rate of data granularity than the rate of non-display frame output rate.

In some embodiments a more complex arrangement is implemented, for example whereby the predefined protocol embeds a first category of non-display frame at every $i^{th}$ frame in the output video signal and embeds a second category of non-display frame at every $j^{th}$ frame in the output video signal. For example, every $i^{th}$ frame contains non-display data relating to machine diagnostics, and every $j^{th}$ frame relates to a bonus game. It will be appreciated that there may be further extension of this concept for some embodiments.

As shown in FIG. 105, a video decoder unit 105 is installed between video output 102 and display screen 105. This video decoder unit is configured to intercept non-display data, such that the non-display data is not displayed via screen 103. For example:

- In some embodiments each non-display frame is dropped (i.e. intercepted and not provided to display screen 103).
- In some embodiments a process is performed such that only non-display data is removed from a non-display frame, and removed portions of the frame are replaced with corresponding portions from a preceding frame.

Figure 3:
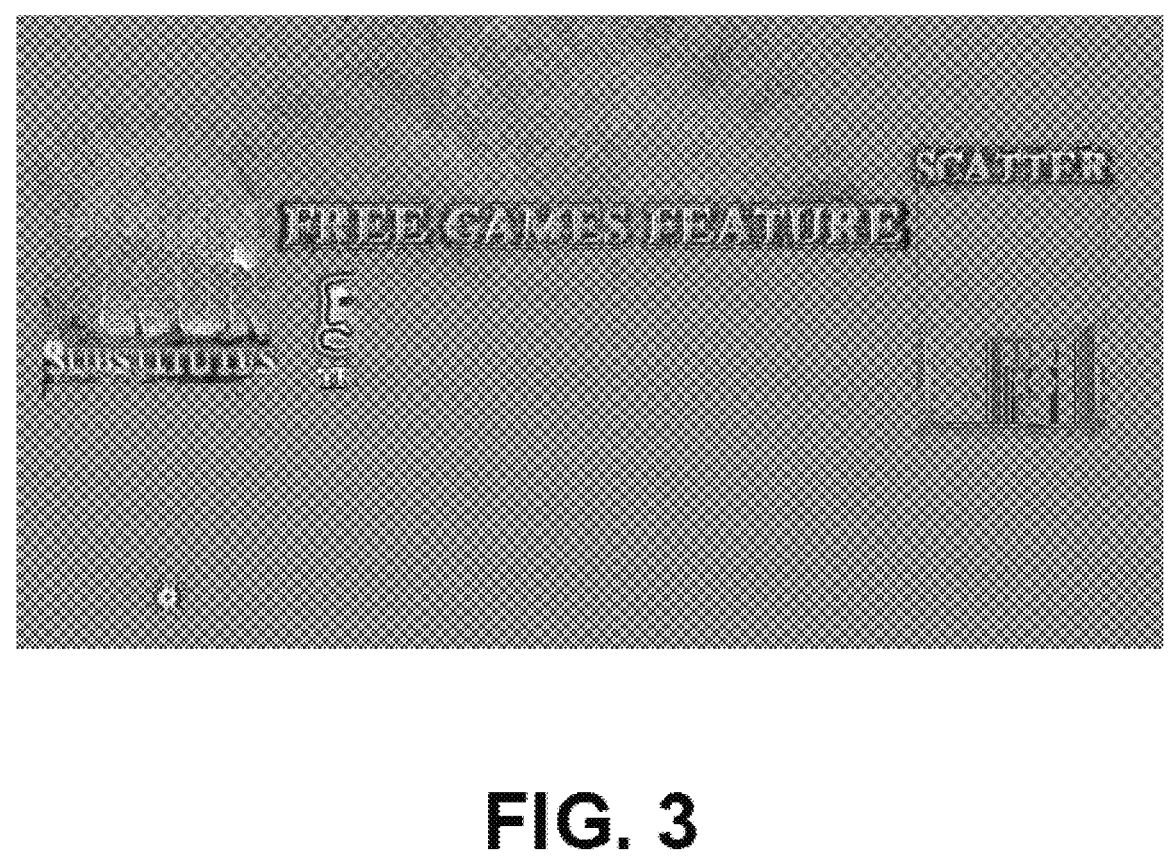

In relation to the latter, in some embodiments a process is performed such that, to mitigate frame loss effects, encode non-displayable data within a frame where a majority of the frame contents are the same as the previous frame. As context, the example of FIG. 3 illustrates, in a checkerboard pattern, screen regions that remain unchanged from a previous frame in respect of an example gaming machine game display rendering. For example, this is common in gaming machines, where there are regions of the screen area used predominately for static background displays.

Non-display data is encoded data in such regions, and the decoder unit removes the non-display data and places only the visual data that has changed on top of the previous frame (so there is no loss of video data) before releasing that frame for display. This in effect eliminates any frame loss: the non-display data is encoded within a frame region where the previous data is the same. Once removed from the frame and the changes overlapped onto the previous frame there is no loss in observable frame rate performance.

Figure 2:
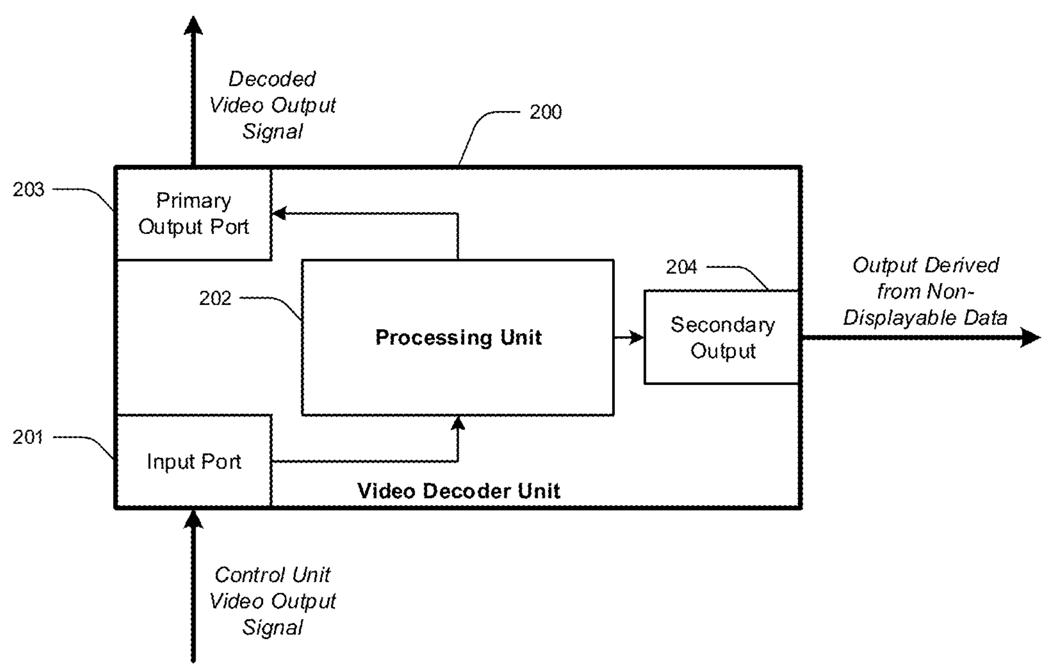
FIG. 2 illustrates a video decoder unit according to one embodiment.

FIG. 2 illustrates a video decoder unit according to one embodiment, in the form of decoder 200. Decoder 200 in some embodiments takes the place for unit 105 in FIG. 1.

Decoder 200 includes an input port 201. This preferably replicates an input port otherwise provided by the EGM's display screen. For example, this may be a HDMI port or DVI port. In some embodiments decoder 200 includes multiple inputs to enable compatibility with multiple EGM types.

Input port 201 is coupled to a processing unit 202, which includes a microprocessor and in some embodiments an associated memory device. For example, the memory device in some embodiments contains software instructions to enable some or all of the following functions:

- Identification of non-display data and non-display frames;
- Processing of non-display frames, for example to extract non-display data and blend with a preceding frame as discussed above;
- Processing of non-display data, for example to provide data renderable by a secondary display screen or connected portable device, thereby to convey to a user information derived from the non-display data;
- Storage of data derived from non-display data (for example a buffer of historical diagnostic data); and
- Execution of a secondary game based on the non-display data.

Decoder 200 includes a primary output port, via which decoder 200 is coupled to the EGM display screen. For example, in some embodiments the primary output port replicates a video output port provided by the EGM controller hardware unit. Again, in some embodiments there are multiple output ports (HDMI, composite, etc.) to enable compatibility of decoder 200 with different EGM hardware configurations. Processor 202 provides an output signal via port 203 which is defined by a continuous stream of video frames for rendering by the EGM display unit. In this regard, input port 201 receives a control unit video output signal from the EGM control unit, and provides a decoded video output signal to the EGM display screen.

Decoder 200 also includes a secondary output port 204. Secondary output port varies in nature between embodiments, and optionally includes one or more of the following output component types:

- A video output (such as DVI or HDMI).
- A serial output.
- A peripheral connectivity output (such as USB).
- A network output (such as Ethernet).
- A wireless output (such as WiFi, Bluetooth, and so on).

In this regard, secondary output 204 enables decoder 200 to connect to a secondary device such as a display screen or a portable computing device (such as a tablet, smartphone, or the like). In the example of FIG. 1, decoder unit 105 is coupled to a mobile device 110 which includes a display screen 111 which enables rendering of information (for example diagnostic information and/or secondary game information) derived from non-display data embedded in non-display frames.

The nature of the secondary device varies between embodiments. For example, in some embodiments the secondary device is required to execute special software to meaningfully process data provided by the decoder. In other embodiments all processing is performed at the decoder, and the secondary device need only provide display functionalities. In some cases the secondary device is a networked device connected to a plurality of EGMs; this allows the use of a decoder to enable networked EGM functionalities such as machine diagnostic monitoring and/or linked gaming.

In this regard, embodiments include methods provided by gaming machines, the methods including: executing a game of chance based on input from a user; defining a primary video display signal, wherein the primary video signal is configured to enable rendering of a graphical output representative of the game of chance at a primary display screen; defining a plurality of non-display frames, wherein the non-display frames are configured to be intercepted by a decoder device, thereby to enable rendering of additional information at a secondary display screen; and providing, via a video output port, an output video signal defined by a continuous sequence of video frames including the primary video display signal and the plurality of non-display frames, wherein the non-display frames are embedded in frames defining the primary video display signal in accordance with a predefined protocol; such that the primary display screen displays the graphical output representative of the game of chance, but does not provide a visually perceptible rendering of the additional information.

In some embodiments diagnostic information is embedded in non-display data, and extracted such that a technician can see real-time temperature, processor usage, memory usage, polling rate of peripherals, what state the machine believes a peripheral is in, etc. . . . . This information can either be analysed on site or encrypted and sent back to a central location for deeper analysis. This allows for solving issues where machines appear to run slowly, where they are unable to communicate with a peripheral, where the machine is frozen, etc. These are often issues that are conventionally challenging to solve without replicating the issue in a lab or the like.

The technology disclosed herein is in some embodiments used for game specific features. An example is an intelligent shared display where multiple EGM's connect to the display and send content. The display can mix the data to show it on the screen, however with this new protocol it allows for EGM choices to also be encoded into the data as well as region information. This means that portions of the display can be controlled by each EGM, and the display can also see and react to choices made, i.e. player selected case number 3, play audio and highlight box 3 with the content in the frame at this x, y, width, height location, all using a single video cable from each EGM.

It will be appreciated that the technology disclosed above has various advantages specific to a gaming environment, on the basis that video output is a one-way transmission technology, and hence does not allow for tampering with a machine. This allows for functionalities such as those disclosed above to be provided with significantly reduced levels of regulatory compliance difficulty.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for operating an electronic gaming machine, the method including:

executing a game of chance within a gaming machine computing hardware unit contained in a secure processor box based on input from a user;

defining a primary video display signal within the gaming machine computing hardware unit, wherein the primary video signal is configured to enable rendering of a graphical output representative of the game of chance at a primary display screen of the electronic gaming machine;

defining a plurality of non-display frames within the gaming machine computing hardware unit, wherein the non-display frames are configured to be intercepted by a decoder device of the electronic gaming machine interposed between the gaming machine computing hardware unit and the primary display screen, thereby to enable rendering of additional information at a secondary display screen; and providing, via a single one-way video output port of the gaming machine computing hardware unit, an output video signal defined by a continuous sequence of video frames including both the primary video display signal and the plurality of non-display frames, wherein the non-display frames are embedded in frames defining the primary video display signal in accordance with a predefined protocol;

such that the primary display screen displays the graphical output representative of the game of chance, but does not provide a visually perceptible rendering of the additional information.

2. A method according to claim 1 wherein the predefined protocol embeds a non-display frame at every ith frame in the output video signal.

3. A method according to claim 1 wherein the predefined protocol embeds a first category of non-display frame at every ith frame in the output video signal and embeds a second category of non-display frame at every ith frame in the output video signal.

4. A method according to claim 1 wherein embedding a non-display frame in the output video signal includes replacing a primary video display signal frame with a non-display frame.

5. A method according to claim 1 wherein embedding a non-display frame in the output video signal includes embedding additional information into a primary video display signal frame.

6. A method according to claim 5 wherein the additional information is embedded at one or more predefined regions in a primary video display signal frame.

7. A method according to claim 6 wherein the one or more predefined regions are regions at which there is minimal inter-frame variation in graphical output representative of the game of chance.

8. A method according to claim 7 wherein a decoder device is configured to remove the predefined region from a frame containing embedded additional information.

9. A method according to claim 1 wherein at least a subset of the non-display frames are configured to be intercepted by a decoder device, thereby to enable rendering of gaming machine diagnostic information at a secondary display screen.

10. A method according to claim 1 wherein at least a subset of the non-display frames are configured to be intercepted by a decoder device, thereby to enable rendering of a secondary game at a secondary display screen.

11. A gaming machine including:

a central control unit that is contained in a secure processor box and configured to execute a game of chance based on input from a user, wherein the central control unit is configured to:

define a primary video display signal, wherein the primary video signal is configured to enable rendering of a graphical output representative of the game of chance at a primary display screen of the gaming machine;

define a plurality of non-display frames, wherein the non-display frames are configured to be intercepted by a decoder device, thereby to enable rendering of additional information at a secondary display screen; and provide, via a single one-way video output port of the central control unit, an output video signal defined by a continuous sequence of video frames including both the primary video display signal and the plurality of non-display frames, wherein the non-display frames are embedded in frames defining the primary video display signal in accordance with a predefined protocol;

a primary display screen;

a decoder unit interposed between the central control unit and the primary display screen, wherein the decoder unit is configured to intercept the output video signal, such that the primary display screen displays the graphical output representative of the game of chance, but does not provide a visually perceptible rendering of the additional information, and such that the additional information is made available for rendering at a secondary display screen.

12. A gaming machine according to claim 11 wherein the predefined protocol embeds a non-display frame at every ith frame in the output video signal.

13. A gaming machine according to claim 11 wherein the predefined protocol embeds a first category of non-display frame at every ith frame in the output video signal and embeds a second category of non-display frame at every ith frame in the output video signal.

14. A gaming machine according to claim 11 wherein embedding a non-display frame in the output video signal includes replacing a primary video display signal frame with a non-display frame.

15. A gaming machine according to claim 11 wherein embedding a non-display frame in the output video signal includes embedding additional information into a primary video display signal frame.

16. A gaming machine according to claim 15 wherein the additional information is embedded at one or more predefined regions in a primary video display signal frame.

17. A gaming machine according to claim 16 wherein the one or more predefined regions are regions at which there is minimal inter-frame variation in graphical output representative of the game of chance.

18. A gaming machine according to claim 17 wherein a decoder device is configured to remove the predefined region from a frame containing embedded additional information.

19. A gaming machine according to claim 11 wherein at least a subset of the non-display frames are configured to be intercepted by a decoder device, thereby to enable rendering of gaming machine diagnostic information at a secondary display screen.

20. A gaming machine according to claim 11 wherein at least a subset of the non-display frames are configured to be intercepted by a decoder device, thereby to enable rendering of a secondary game at a secondary display screen.

* * * * *